Patented Dec. 20, 1932

1,891,451

UNITED STATES PATENT OFFICE

WALTER C. SAMPLE, OF ALHAMBRA, CALIFORNIA, ASSIGNOR OF ONE-FOURTH TO OLE JOHN LOVIK, OF ALHAMBRA, CALIFORNIA

PAINT

No Drawing.   Application filed December 20, 1930.   Serial No. 503,858.

This invention relates to improvements in surfacing compounds and pertains particularly to a paint designed for all purposes, particularly outside use.

The primary object of the present invention is to provide a paint or dressing which, when applied, will form a coating which will assume a glossy finish and will not become hard and cracked under exposure to the weather.

Another object of the invention is to provide a paint which will form a lasting waterproof covering and will not be affected by heat.

A still further and important object of the invention is to provide a paint having cement as an ingredient thereof and having in combination therewith a chemical which serves to prevent the settling of the cement and hardening thereof, so that the paint may be kept over a long period without becoming unfit for use.

The paint is made up of the following ingredients taken in the approximate proportions indicated:

|  | Per cent |
|---|---|
| White lead | 37½ |
| Keen's cement | 12 |
| Tartaric acid | ½ |
| Linseed oil | 42½ |
| Turpentine | 5 |
| Japan drier | 1½ |
| Dissolved paraffin | ½ |
| Carbon tetrachloride | ½ |

In mixing the ingredients the cement is first mixed and allowed to soak in the linseed oil, the resultant product being of about the same consistency as the usual white lead mixture of commerce. There is then added to the cement-linseed oil mixture the quantity of tartaric acid called for and this is thoroughly stirred thereinto. The tartaric acid prevents the cement from settling and getting hard in the oil after the paint has been put up for sale. The white lead is next mixed with the cement and oil and the mixture obtained is then run through a suitable paint grinder to work the mixture up smooth and free from lumps. After running the lead, cement and oil mixture through the grinder the other liquids enumerated may then be added and thoroughly incorporated. The paraffin is preferably dissolved in a small amount of kerosene so that it will blend thoroughly with the other fluids and thus be thoroughly distributed through the mixture.

It will, of course, be understood that any desired color may be given to the paint after it has been mixed in the manner described and after this paint mixture has been applied it will be found capable of withstanding extreme heat without hardening and cracking and, in addition to this, it will not be affected by salt air.

As previously stated, the tartaric acid serves to prevent the settling and hardening of the cement in the mixture, and the mixed linseed oil and cement form together a tough wear resisting covering.

The japan drier and turpentine, of course, assist in causing rapid drying out of the mixture after it is applied, as in other paint compositions employing a lead base in linseed oil, and the paraffin increases the resistance of the mixture against the penetration of moisture while the carbon tetrachloride resists the action of heat thereon.

Having thus described my invention, what I claim is:

A paint composition of the character described, comprising white lead, Keen's cement, tartaric acid, linseed oil, turpentine, japan drier, paraffin, and carbon tetrachloride.

In testimony whereof I hereunto affix my signature.

WALTER C. SAMPLE.